Figure 1:
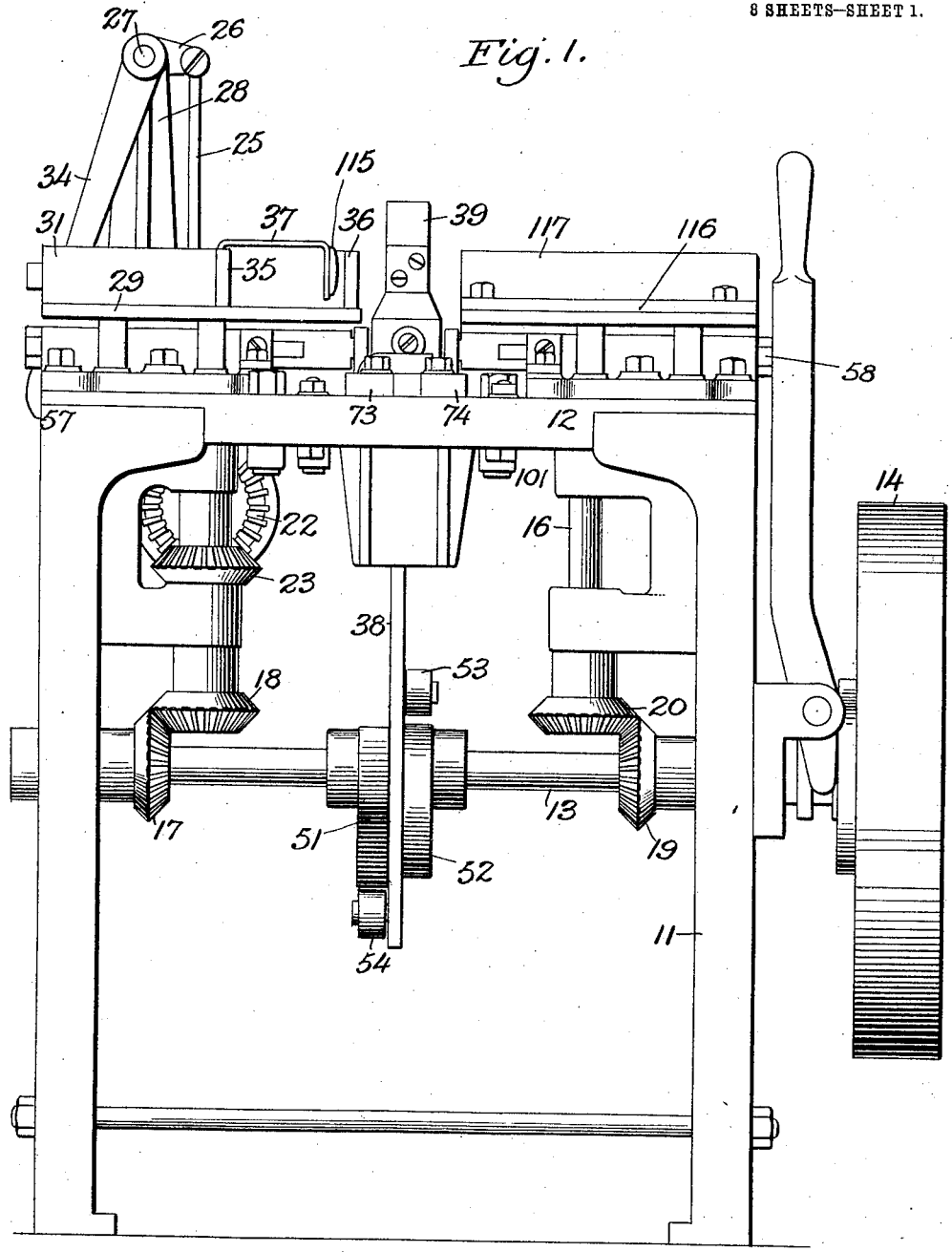

J. BRENZINGER.
FLANGING MACHINE.
APPLICATION FILED JAN. 20, 1909.

1,058,942.

Patented Apr. 15, 1913.
8 SHEETS—SHEET 1.

WITNESSES

INVENTOR

J. BRENZINGER.
FLANGING MACHINE.
APPLICATION FILED JAN. 20, 1909.

1,058,942.

Patented Apr. 15, 1913.
8 SHEETS—SHEET 3.

WITNESSES
James F. Duhamel
Aaron Ginsberg

INVENTOR
Julius Brenzinger
BY
ATTORNEY

J. BRENZINGER.
FLANGING MACHINE.
APPLICATION FILED JAN. 20, 1909.

1,058,942.

Patented Apr. 15, 1913.

8 SHEETS—SHEET 4.

J. BRENZINGER.
FLANGING MACHINE.
APPLICATION FILED JAN. 20, 1909.

1,058,942.

Patented Apr. 15, 1913.

8 SHEETS—SHEET 6.

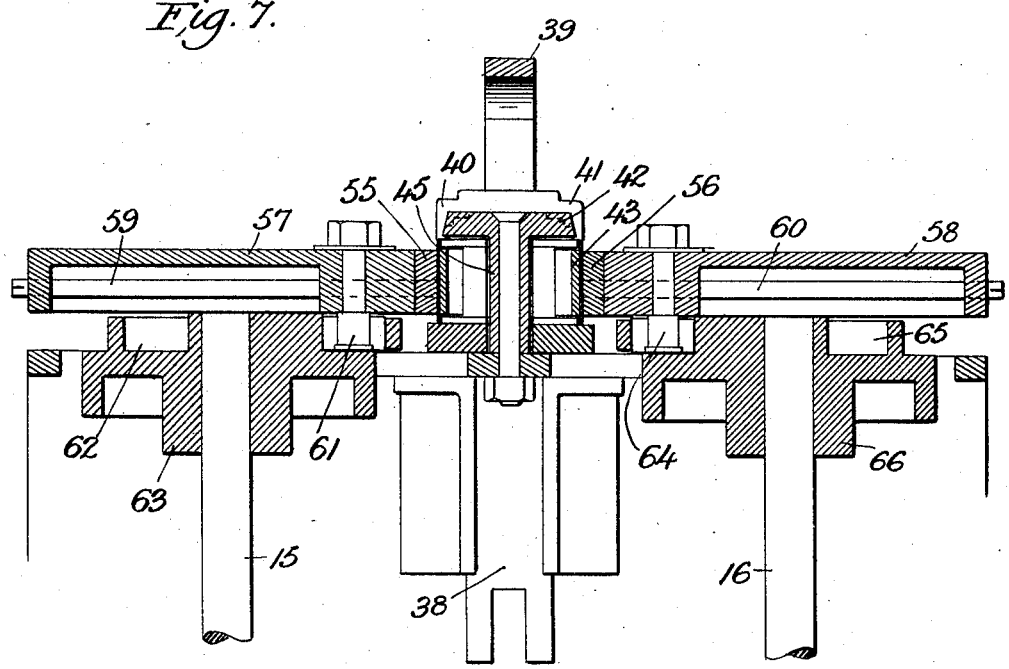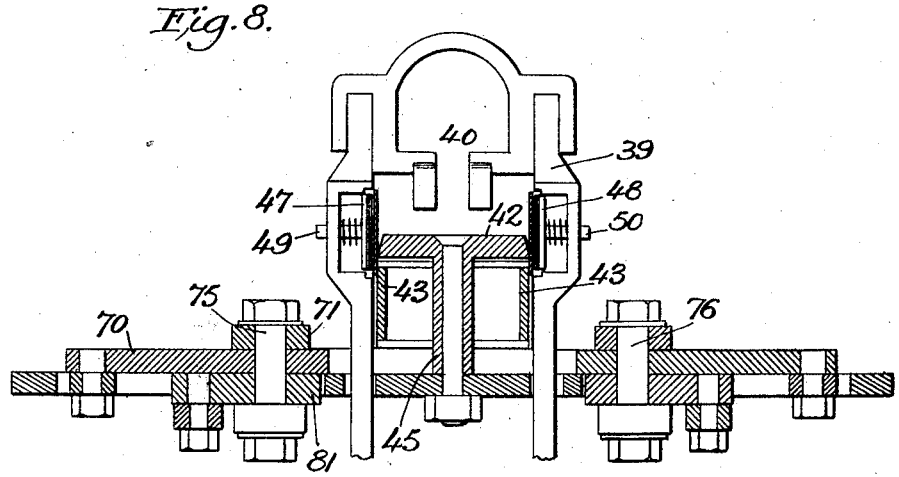

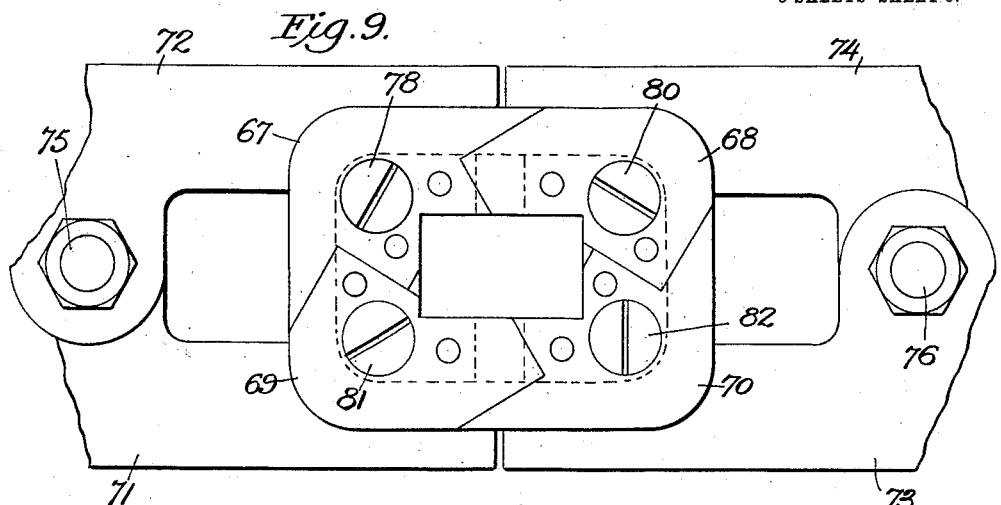
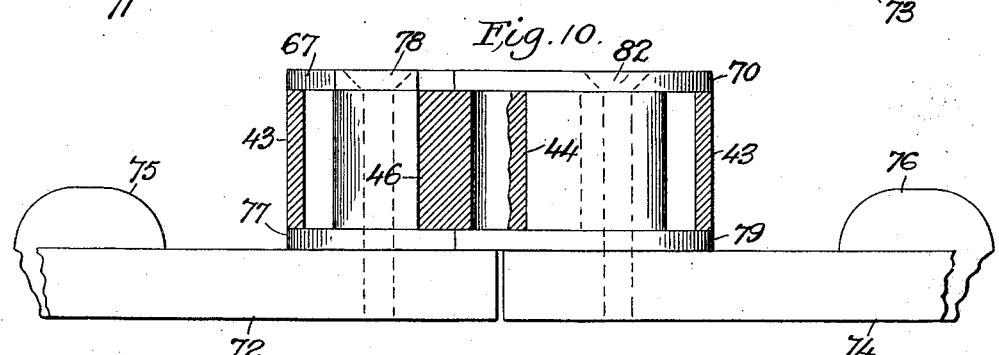
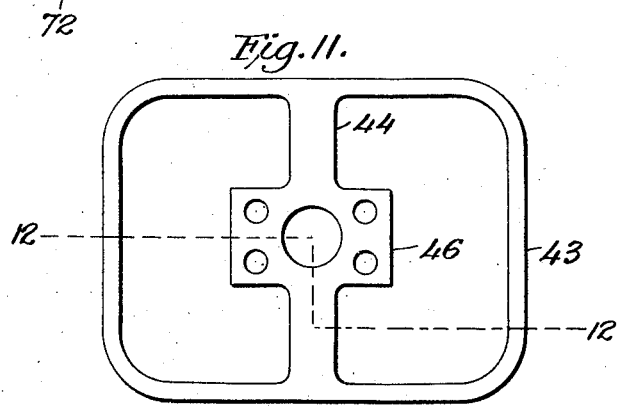
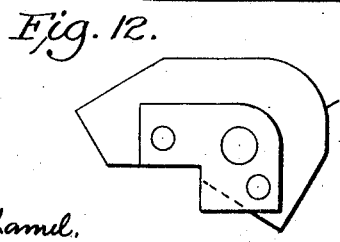

UNITED STATES PATENT OFFICE.

JULIUS BRENZINGER, OF MOUNT VERNON, NEW YORK, ASSIGNOR TO SANITARY CAN MACHINERY COMPANY, OF ELLSWORTH, MAINE, A CORPORATION OF MAINE.

FLANGING-MACHINE.

1,058,942.      Specification of Letters Patent.      Patented Apr. 15, 1913.

Application filed January 20, 1909. Serial No. 473,375.

*To all whom it may concern:*

Be it known that I, JULIUS BRENZINGER, a citizen of the United States, residing at Mount Vernon, in the county of Westchester and State of New York, have invented certain new and useful Improvements in Flanging-Machines, of which the following is a specification.

This invention relates to flanging machines, with particular reference to machines for flanging the end edge or edges of can bodies, such flange being essential to the double-seaming operation by means of which the heads and bottoms of cans are now more generally secured to the bodies thereof.

As is well known, the operation of flanging what is known as a round can body—that is, one of substantially cylindrical configuration—presents few difficulties, but an entirely different proposition is encountered when it is undertaken to flange the bodies of what are known as square cans—that is, can bodies of substantially rectilinear configuration with more or less sharply rounded corners. The well known sardine can is a sample of what I refer to as a square can. It will be apparent that while the rectilinear edges of such a can body may be readily flanged, an effort to flange the sharply rounded corners often results in a fracture of the metal, the limit of elasticity of which falls short of that necessary to provide for the stretching of the metal at the corners to provide the flange. Undoubtedly with the exercise of great care, or through the employment of a series of operations to gradually flange the body at these corners, the metal may be shaped without breaking, but such process would be entirely too slow for practical or commercial purposes, and when it comes to providing a machine to flange the end edges of square can bodies very rapidly and automatically, I have found that all known mechanical movements of parts to accomplish this flanging operation fail to insure against the breaking of the flange in by far too large a proportion to the bodies flanged.

The sheet metal of which ordinary tin cans are constructed, for purposes both of cheapness and ease of forming, is naturally very thin, and the trouble with attempts to flange the more or less sharply rounded corner of a square can body, by any known mechanical flanging process, is that there is insufficient stock to provide for the necessary stretching of the metal at these points. It would obviously be impracticable to attempt to increase the stock of metal at any one or another point in the sheet metal blank, and there is, therefore, the necessity of drawing upon the stock in some adjacent portion of the blank. I have found that this may be accomplished, and to this end the principal object of the present invention is the provision of a machine in which the flanging operation is accomplished by a relative movement of parts, so directed that the stock of metal in that portion of the rectilinear flange which is adjacent to the desired flange at the rounded corner, is drawn upon in forming the flange at said corner, and thus insure the formation of an intact and perfect flange. Furthermore, this relative movement of parts also insures a gradual formation of the flange at the rounded corner and yet is capable of operation at sufficient speed to give the machine a great capacity.

Incidental to the above, I have in view a machine which is so far as possible automatic in action, comparatively simple in construction and therefore not prohibitive in cost, and one which is rapid and dependable in operation.

My invention will be more readily understood by reference to the accompanying drawings, forming a part of this specification, in which—

Figure 2:
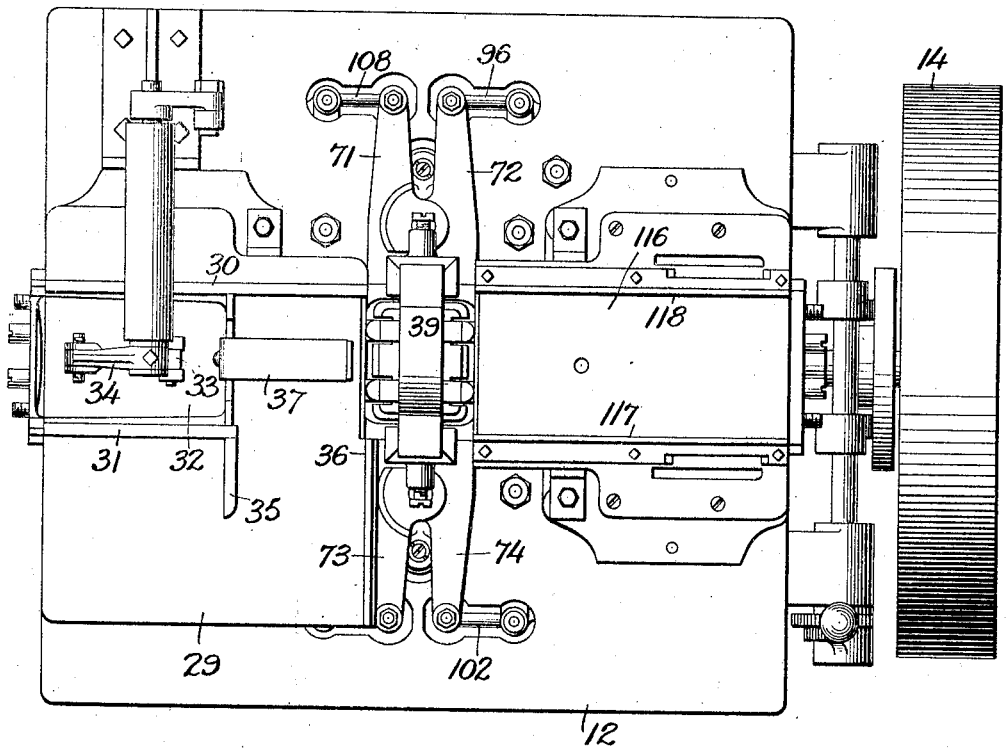
Figure 3:
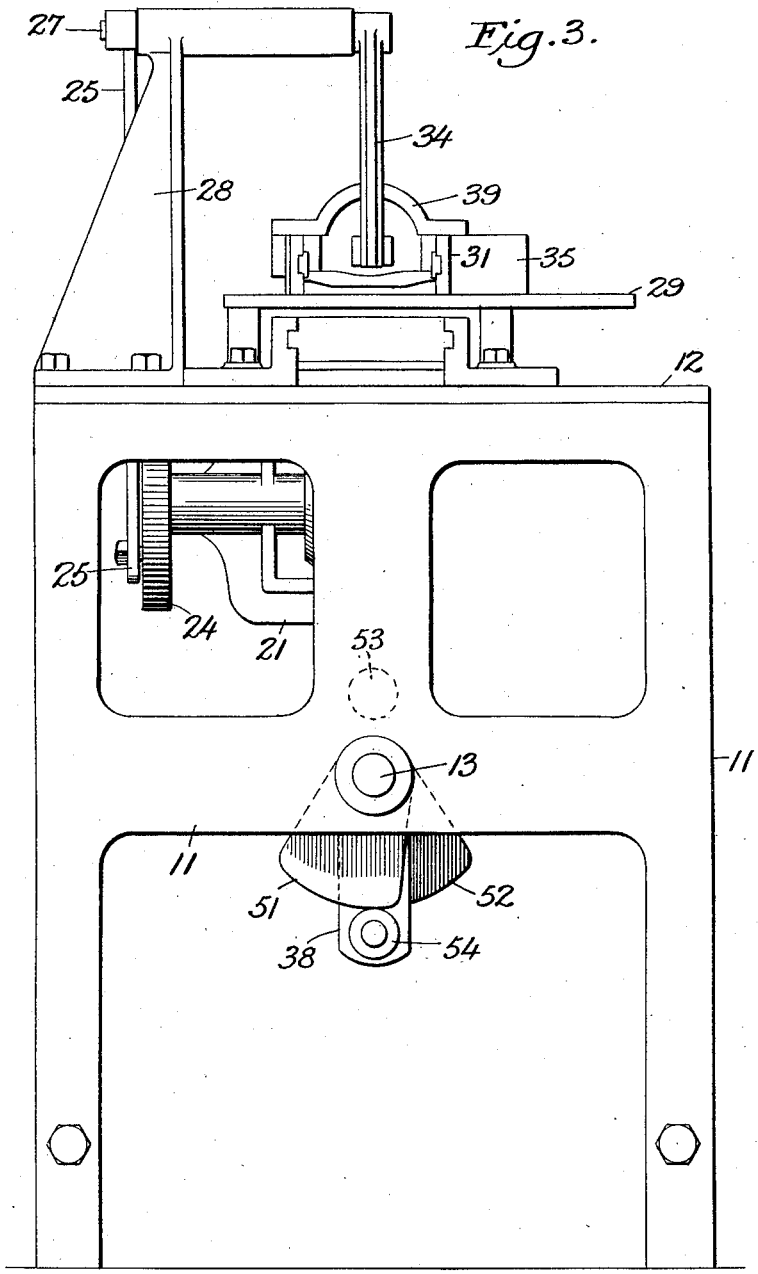
Figure 4:
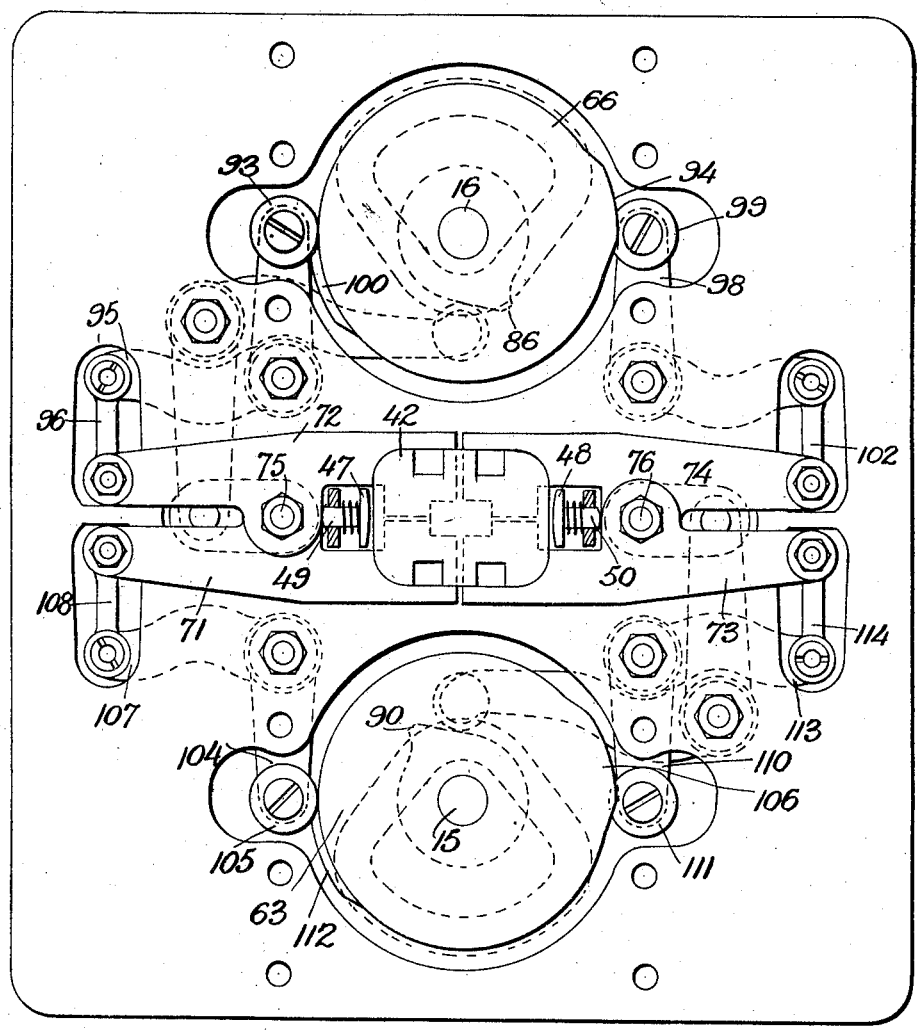
Figure 5:
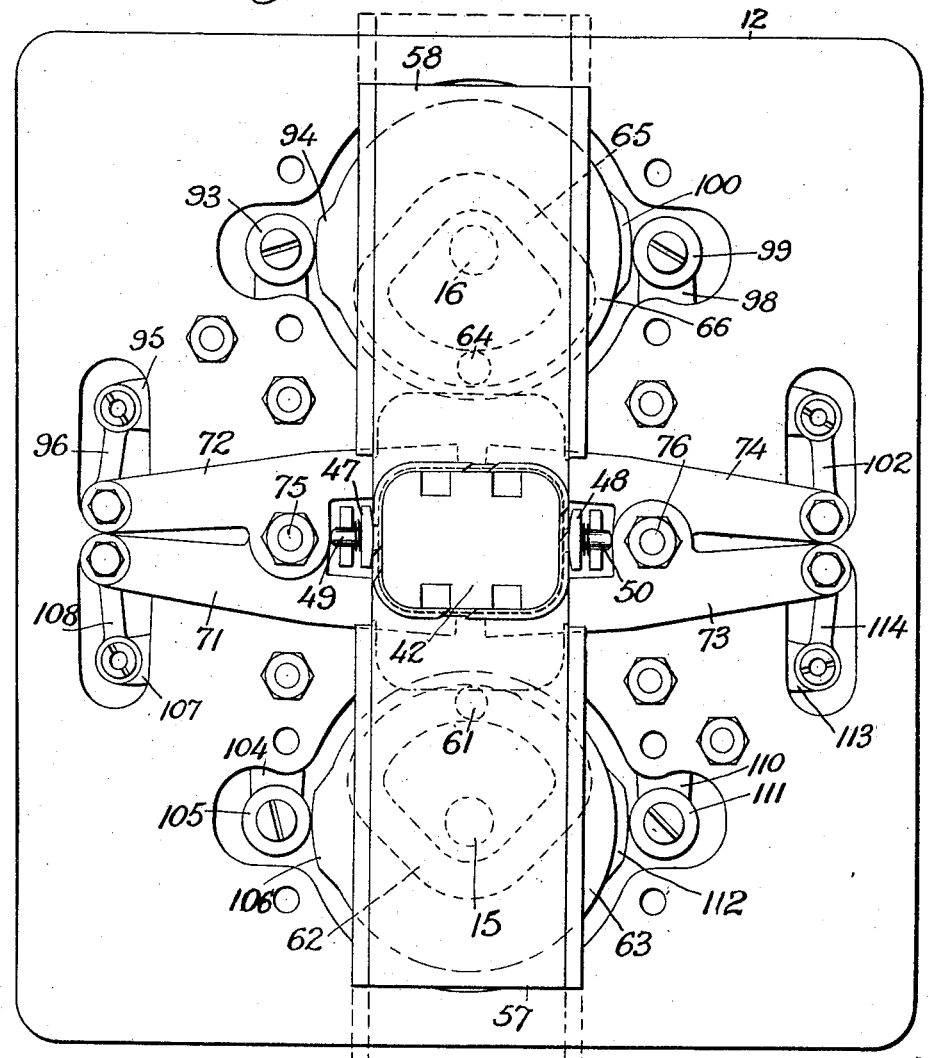
Figure 6:
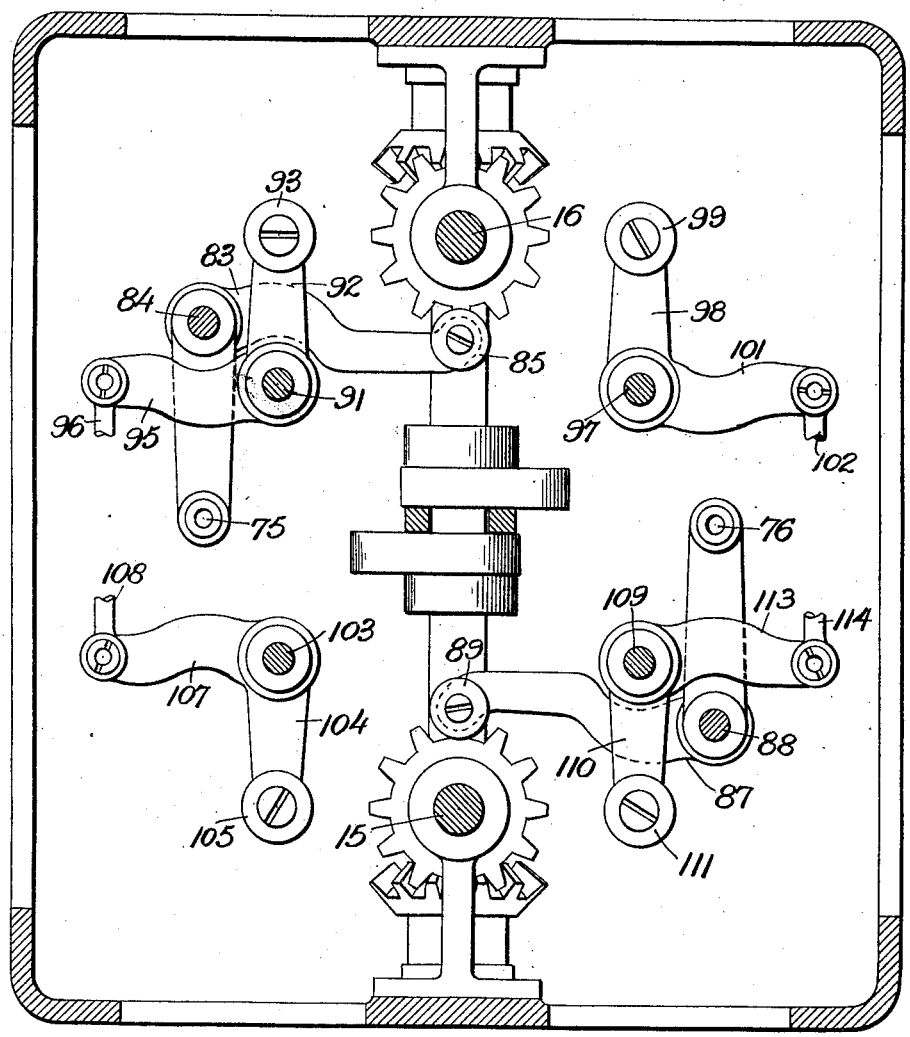

Figure 1 is a side elevation of a machine embodying my invention; Fig. 2 is a top plan view thereof; Fig. 3 is an end elevation thereof; Fig. 4 is an enlarged top plan view of the operating mechanism with the delivering and ejecting mechanism removed; Fig. 5 is a similar view with the parts in a different position of adjustment; Fig. 6 is a horizontal section taken just beneath the base or bed-plate shown in Figs. 4 and 5; Fig. 7 is a vertical section on an enlarged scale of the body clamping and flanging mechanism; Fig. 8 is a transverse central section of the same with the parts in a different position of adjustment; Fig. 9 is an enlarged top plan view of the upper flanging mechanism and its support; Fig. 10 is a vertical central section of the same; Fig. 11 is a top plan view of the horn or support for the can body during the flanging operation, and Fig. 12 is a detail view of one of the sections of the flanging plate.

Referring now to the drawings in detail, numeral 11 refers to a heavy supporting frame carrying the plate or platform 12. Suitably journaled in the frame 11 is the main power shaft 13 carrying the pulley 14 which may be connected in the usual manner to any suitable source of power. Also journaled in the frame 11, or in suitable brackets or hangers secured thereto, are the two vertical shafts 15 and 16, the shaft 15 being driven from the shaft 13 through the interposition of the bevel gears 17 and 18, while the shaft 16 is similarly driven by means of the bevel gears 19 and 20. Journaled in the bracket 21, which is carried by the frame 11, is a short horizontal shaft (which does not appear in the drawings), to which is secured the bevel gear 22 in mesh with the bevel gear 23 on the shaft 15. To the other end of this short shaft is affixed the disk-wheel 24, which is provided with a suitable cam-groove, in which rides a roller (not shown) on the vertical rod 25, whereby said rod is vertically reciprocated in suitable slide bearings in a common and well known manner. This rod 25 is pivoted to the crank-arm 26 on the shaft 27, which is journaled in suitable bearings in the supporting bracket 28.

Suitably supported a short distance above the table or platform 12 is the plate 29, to the upper face of which are secured the guide-strips 30 and 31, providing a track for the reciprocation of the carriage 32. To this carriage 32 is pivoted the end of the arm 33, which, in turn, is pivoted to the crank-lever 34 fixed to the shaft 27, whereby upon rocking said shaft 27 said carriage will be reciprocated. The plate or platform 29 is further provided with the guide-strips 35 and 36 rectangularly disposed with reference to the guide-strips 30 and 31 and forming a track or way which intersects the track or way provided by said guide-strips 30 and 31. The carriage 32 is provided with an inverted U-shaped receptacle and pusher 37, of a size and for the purpose which will be hereinafter set forth.

Vertically reciprocating through suitable openings or apertures in the plate 12, is the sliding bar 38, at the upper end of which is mounted the frame 39 which includes the laterally projecting arms 40 and 41. Between the vertical side arms of the frame 39, supported at a suitable distance above the plate 12 and in the same plane as the plate 29, is the guide plate 42, between which and said plate 12 is the hollow horn or mandrel 43. This horn or mandrel 43 is preferably provided with a central cross-brace 44, apertured for the reception of the cylindrical support 45 of the guide plate 42. The cross-brace 44 includes the plate 46 by means of which the horn or mandrel 43 is firmly and rigidly secured to the support 45. This horn or mandrel 43 is of substantially the same size and shape as the can body which it is desired to flange, the exterior dimensions of said horn being slightly less than the interior dimensions of said can body, whereby the latter may be readily slipped on and off over said horn. These can bodies are placed in succession upon the plate 29 between the guides 35 and 36, in a short row, one pushing the other until the foremost body is under the receptacle and pusher 37, the distance between the vertical arms of which corresponds to the shorter dimension of the can body.

It will be apparent that movement of the carriage 32, due to rocking of the shaft 27, may be so timed that the can body which is engaged by the pusher 37 will be carried in a forward direction underneath the frame 39 and over the guide plate 42. The frame 39 is provided with suitable recesses, within which are located the plates 47 and 48, mounted upon the ends of the sliding rods 49 and 50, respectively, and normally spring-pressed toward each other. These plates 47 and 48 may be faced with some yielding and slightly elastic material, such as leather, so that the can body, when forced over the plate 42, will be yieldingly retained in position over the space below said plate by the clamping effect of the plates 47 and 48. These clamping plates are so positioned as to receive the can body when the latter is pushed over the plate 42, and carry said body downwardly when the frame 39 is depressed, the arms 40 and 41 being adapted to make the downward movement of the can body more positive. To vertically reciprocate said frame 39, the rod or bar 38 is provided with a slot, through which passes the shaft 13. On said shaft 13 are fixed the cams 51 and 52, one on each side of said bar 38, the cam 52 acting upon the roller 53 on said rod or bar 38 to raise the latter, and said cam 51 coöperating with a roller 54 to positively depress said rod 38. I provide two cams so that the reciprocations of said bar 38 may be under positive control in both directions. It will be apparent that the configuration of these cams may be made such that the bar 38 is depressed immediately after the shaft 27 has been rocked to carry a can body underneath the arms 40 and 41.

When the can body has been properly positioned around the horn or mandrel 43 by the depression of the frame 39, both the top and bottom edges of the can body project above and below, respectively, the top and bottom edges of the plates 47 and 48, spaces thus being provided for the turning of top and bottom flanges into the recesses in the frame 39 which are provided for said plates 47 and 48, as illustrated in Fig. 8. In this position, the can body is adapted to be embraced by the clamping members 55 and 56, oppositely located with respect to said body and which are provided with inner faces which correspond in configuration to that of said can body and said horn or mandrel 43, the vertical dimensions of these clamping members being slightly less than the height of the can body whereby they are non-interferent with the flanging of the top and bottom edges of said body. These clamping members 55 and 56 are mounted at the ends of the reciprocating carriages 57 and 58, to which carriages they are adjustably secured by means of the adjusting screws 59 and 60. It is necessary that the can body be firmly clamped around the horn or mandrel 43 during the flanging operation, and these clamps must obviously be withdrawn for the purpose of ejecting a flanged body and properly positioning a body to be flanged. To reciprocate these carriages for this purpose, and to properly time reciprocations thereof, I have shown the carriage 57 provided with a roller 61 on the lower face thereof, said roller projecting into a cam-groove 62 of suitable configuration within the multiple cam member 63, secured to the upper end of the shaft 15. The carriage 58 is similarly reciprocated by means of the roller 64 on the lower face thereof projecting into the cam-groove 65 in the multiple cam member 66 secured to the upper end of shaft 16.

The flanging mechanism proper comprises upper and lower flanging plates which in their normal positions lie wholly within the plane of the side walls of the can body, whereby said body may be readily slipped on and off over the horn or mandrel. When the can body is in place upon the horn and is tightly clamped in this position by the opposite clamping members, as explained, these flanging plates, located just within opposite edges of the can body, are adapted to be forced outwardly and bend the metal to provide the desired flanges. I have hereinbefore referred to the fact that these flanging plates must be given a peculiar movement in order to prevent cleavage of the metal in the flange at the more or less sharply rounded corner of the can body.

Referring first to the upper flanging plates (of which the lower plates are substantially the opposite counterparts) it will be apparent that to accomplish the best results, the operative edge of these plates should be substantially continuous during the flanging operation. On the other hand, in view of the fact that forces must be directed substantially radially in all directions, to flange the entire edge of the can body, it will be apparent that the plates, treated now as a unit, must be expanded, and being sectional for this purpose, the flanging edges of the plates must be broken at intervals to provide for this expansion. It being my object to first bend the metal along the longer side edges of the substantially rectilinear body, an operation which is attended with but few difficulties, I prefer to first spread these flanging plates in the direction of these longer side edges, and subsequently spread them in a transverse direction, through which process not only are the rounded corners flanged in the manner I have hereinbefore set forth, but the shorter side edges of the can body are simultaneously flanged. Finally, in returning these separable sections of the flanging plate to their contracted and normal condition, they may be given a rotary movement to compensate for any slight defect which may remain, due to the break in the edges of the plate when the sections thereof are expanded or spread.

In order to provide for the movement above described, I separate each of these flanging plates into four sections, preferably of the configuration shown in Fig. 9, whereby, as will be noted, while each contiguous pair of sections are locked together against relative lateral movement, they are, nevertheless, separable in pairs, the section 67 and the section 68 being capable of being withdrawn from the sections 69 and 70, whereupon, the sections 67 and 69 may be separated from the sections 68 and 70, respectively.

It will be apparent that movements should be imparted simultaneously and correspondingly to both the upper and lower flanging plates. To effect such movement, I provide two pairs of lever arms, 71, 72, and 73, 74, the arms 71 and 72 comprising one pair, being provided with overlapping lateral projections which are pivoted together at 75, and the arms 73 and 74 being provided with corresponding lateral projections which are pivoted together at 76, all of these arms resting against the flat upper face of the plate 12. At the end of the arm 72 is secured the section 67 of the upper flanging plate and its opposite counterpart 77 in the lower flanging plate. These plate-sections are preferably secured to said arm by means of a screw or rivet 78 which passes through both of said sections, the lower 77 thereof being held against the flat upper face of the end of the arm 72 and the upper 67 thereof being held against the top surface of the forming horn 43. Similarly, the upper plate-section 68 and its opposite counterpart 79 are correspondingly secured to the end of the arm 74 by means of the screw or rivet 80. In a precisely similar manner, the plate-sections 69 and 70, and their opposite counterparts, are secured at the ends of the arms 71 and 73, respectively, by means of the screws or rivets 81 and 82. It will be apparent that these screws or rivets, passing upwardly through the space within the hollow forming-horn 43, are adapted to move the plate-sections through movement of said arms entirely independently of the forming-horn, which is held stationary by means of plate 46.

To impart movement to the arms 71, 72, 73, and 74, I provide a bell-crank lever 83, pivoted at 84 to the plate 12, one arm thereof being preferably provided with a roller 85 adapted to be impinged by the cam 86 which forms a part of the multiple cam member 66 on the shaft 16. The other arm of the lever 83 is secured at its end to the pivot 75 upon which the arms 71 and 72 are mounted. Similarly, I pivot a corresponding bell-crank lever 87 at 88 to the plate 12, one arm thereof being similarly provided with a roller 89, adapted to be impinged by the cam 90 on the shaft 15. These cams 86 and 90 are correspondingly shaped and positioned, and it will be apparent that they will operate through the rollers 85 and 89 therein to correspondingly move and time movement of the bell-crank levers 83 and 87. These levers 83 and 87 being pivoted, respectively, to the pivots 75 and 76 of the arms 71, 72 and 73, 74, will effect the joint longitudinal movement of each pair of said arms in opposite directions.

Pivoted at 91 to the lower face of the plate 12, is a bell-crank lever, the arm 92 of which is provided with a roller 93 impinging against the upper edge of the periphery of the disk or multiple cam member 66, which is provided with the cam 94. The other arm 95 of said lever is pivotally connected to the end of the arm 72 through the medium of the link 96. Similarly, I mount upon the pivot 97 a corresponding bell-crank lever, the arm 98 of which is provided with a roller 99 similarly impinging against the lower edge of the periphery of said disk 66, which is provided with a cam 100 oppositely located with respect to the cam 94. The other arm 101 of this bell-crank lever is similarly connected to the end of the arm 74 through the medium of the link 102. In a similar manner, I mount upon the pivot 103 a corresponding bell-crank lever, the arm 104 of which is provided with a roller 105 impinging against the upper edge of the periphery of the disk or multiple cam member 63, which is provided with the cam 106. The other arm 107 of this lever is similarly connected to the end of the arm 71 by means of the link 108. Similarly, I provide a pivot 109 upon which is mounted a corresponding bell-crank lever, the arm 110 of which is provided with a roller 111 impinging against the lower edge of the periphery of the cam disk 63, which is provided with a cam 112 oppositely located with respect to the cam 106. The other end 113 of this lever is similarly connected to the end of the arm 73 by means of the link 114. It will now be apparent that these arms 71, 72, 73 and 74 have two separate, distinct and independent movements. First, each connected pair thereof has longitudinal movement in opposite directions through the movement imparted to their common pivots by means of the bell-crank levers 83 and 87. Second, each of said arms is independently rotated upon its pivot by means of one of the links 96, 102, 108 and 114, these links being operated in the manner described. It will be seen, therefore, that the arms 71, 72, 73 and 74 may first be rotated in pairs about their pivots to spread apart the inner ends thereof and thus separate the plate sections 67 and 68 and their opposite counterparts, from the plate sections 69 and 70 and their opposite counterparts. Subsequently, these arms are moved longitudinally away from each other, thereby separating the plate section 67 and its opposite counterpart from the plate section 68 and its opposite counterpart, the plate sections 69 and 70 and their respective lower counterparts being similarly separated. Furthermore, while I have referred to these movements in a general way as being separated in point of time, it will be apparent that such movements really overlap each other, so to speak, whereby as the plate-sections 67 and 68 are separated, a revolutionary or circular movement is imparted thereto which terminates when the plate-sections 68 and 70 have been brought together, which is effected prior to the longitudinal movement of the arms which return the same to their normal or original positions. The object of this peculiar movement, as hereinbefore suggested, is to provide for the flanging of the more or less sharply rounded corners without fracture of the metal. It will be seen that the longer side edges of the can body are first flanged by movement of the respective pairs of plate-sections, after which the peculiar circular movement described is effected to flange the round corners and simultaneously the shorter side edges of the can body. It will be noted that after the separated plates 67 and 69 have been withdrawn from the plates 68 and 70 through longitudinal movement of the arms carrying said plates, the plates 67 and 69, and the plates 68 and 70, are again brought together prior to their return to their normally contracted condition, thus insuring a continuously uniform flange along the shorter end edges of the can body.

As hereinbefore explained, the can body has been received between the spring-pressed clamping plates 47 and 48, which have been carried downwardly with the frame 39, carrying the can body therewith, and which are non-interferent with the flanging operation. After this flanging operation, the cam-grooves 62 and 65 in the multiple cam members 53 and 66, respectively, operate through the rollers 61 and 64 to withdraw the clamping or supporting members 55 and 56 to permit of the raising of the flanged body. Immediately thereafter, the cam 52 on the shaft 13 operates through the roller 53 on the slotted bar 38 to return the frame 39 to its elevated position, the spring-pressed clamping plates 47 and 48 carrying the now flanged can body upwardly with said frame and holding the same above the plate 42. In this position, the now flanged can body is engaged by the pad or head 115 at the end of the inverted U-shaped receptacle and pusher 37, whereby the movement of said pusher adapted to carry an unflanged can body into position for the flanging operation, also pushes the body which has just been flanged, and is yieldingly retained between the plates 47 and 48, upon the plate 116, which is preferably provided with strips 117 and 118 to provide a track or way along which the flanged bodies push each other for delivery at the end thereof to any desired form of chute or conveyer.

Many modifications of minor details of my improved flanging machine will doubtless readily suggest themselves to those skilled in the art to which it appertains, and I therefore do not desire to limit my invention to the specific construction herein shown and described.

I claim as new and desire to secure by Letters Patent:

1. In a flanging machine, the combination, with means for supporting a can body, of means lying wholly within and between the end edges of said body when positioned and operated from the exterior thereof to flange an end edge of said body, and means for successively delivering unflanged bodies to said supporting means.

2. In a flanging machine, the combination, with means for supporting a can body, of means lying wholly within and between the end edges of said body when positioned and operated from the exterior thereof to flange an end edge of said body, and means for successively delivering unflanged bodies to and ejecting the flanged bodies from said supporting means.

3. In a flanging machine, the combination, with means for supporting a can body, of means lying wholly within and between the end edges of said body when positioned and operated from the exterior thereof to simultaneously flange both end edges of said body.

4. In a flanging machine, the combination, with means for supporting a can body, of means lying wholly within and between the end edges of said body when positioned and operated from the exterior thereof to simultaneously flange both end edges of said body, and means for successively delivering unflanged bodies of said supporting means.

5. In a flanging machine, the combination, with means for supporting a can body, of means lying wholly within and between the end edges of said body when positioned and operated from the exterior thereof to simultaneously flange both end edges of said body, means for successively delivering unflanged bodies to and ejecting the flanged bodies from said supporting means.

6. In a flanging machine, the combination, with means for suitably supporting a substantially rectilinear can body having rounded corners, of means normally lying wholly within said body when positioned and operated from the exterior thereof to first flange opposite straight portions of an end edge of said body and subsequently to flange the rounded corners and the remaining straight portions of said end edge.

7. In a flanging machine, the combination, with means for suitably supporting a substantially rectilinear can body having rounded corners, of means first operable to flange opposite straight portions of an end edge of said body and subsequently to flange the rounded corners and the remaining straight portions of said edge, and means for successively delivering unflanged bodies to said supporting means.

8. In a flanging machine, the combination, with means for suitably supporting a substantially rectilinear can body having rounded corners, of means first operable to flange opposite straight portions of an end edge of said body, and subsequently to flange the rounded corners and the remaining straight portions of said edge, and means for successively delivering unflanged bodies to and ejecting the flanged bodies from said supporting means.

9. In a flanging machine, the combination, with means for suitably supporting a substantially rectilinear can body having rounded corners, of means normally lying wholly within said body when positioned and operated from the exterior thereof to first simultaneously flange opposite straight portions of both end edges of said body and subsequently to flange the rounded corners and the remaining straight portions of said end edges.

10. In a flanging machine, the combination, with means for suitably supporting a substantially rectilinear can body having rounded corners, of means first operable to simultaneously flange opposite straight portions of both end edges of said body and subsequently to flange the rounded corners and the remaining straight portions of said edges, and means for successively delivering unflanged bodies to said supporting means.

11. In a flanging machine, the combination, with means for suitably supporting a substantially rectilinear can body having rounded corners, of means first operable to simultaneously flange opposite straight portions of both end edges of said body and subsequently to flange the rounded corners and remaining straight portions of said edges, and means for successively delivering unflanged bodies to and ejecting the flanged bodies from said supporting means.

12. In a flanging machine, the combination, with means for interiorly supporting a can body, of means for expanding a portion of said supporting means to flange an end edge of said body, and means for successively delivering unflanged bodies to said supporting means.

13. In a flanging machine, the combination, with means for interiorly supporting a can body, of means for expanding a portion of said supporting means to flange an end edge of said body, and means for successively delivering unflanged bodies to and ejecting the flanged bodies from said supporting means.

14. In a flanging machine, the combination, with means for interiorly supporting a can body, of means for expanding portions of said supporting means to simultaneously flange both end edges of said body, and means for successively delivering unflanged bodies to said supporting means.

15. In a flanging machine, the combination, with means for interiorly supporting a can body, of means for expanding portions of said supporting means to simultaneously flange both end edges of said body, and means for successively delivering unflanged bodies to and ejecting the flanged bodies from said supporting means.

16. In a flanging machine, a segmental flanging plate and means for separating the segments from each other by curvilinear movement to have the effect of expanding said plate.

17. In a flanging machine, a segmental flanging plate and means for first separating pairs of segments from each other and subsequently separating the segments of each pair to have the effect of expanding said plate.

18. In a flanging machine, a segmental flanging plate and means for first separating plate-segments in pairs and subsequently separating the segments of each pair by curvilinear movements.

19. In a flanging machine, the combination, with means for supporting a can body, of a segmental flanging plate normally wholly included with an end edge of said body when positioned, and means for separating the segments by curvilinear movement to have the effect of expanding said plate.

20. In a flanging machine, the combination, with means for suitably supporting a can body, of a segmental plate normally wholly included within an end edge of said body when positioned, and means for first separating pairs of the segments of said plate from each other and subsequently separating the segments of each pair.

21. In a flanging machine, the combination, with means for suitably supporting a can body, of a pair of segmental plates each normally wholly included within an end edge of said body when positioned, and means for correspondingly separating the segments of each plate to have the effect of expanding said plates.

22. In a flanging machine, the combination, with means for suitably supporting a can body, of a pair of segmental plates each normally wholly included within an end edge of said body when positioned, and means for first simultaneously separating corresponding pairs of the segments of each plate, and subsequently correspondingly separating the segments of each pair, to have the effect of expanding said plates.

23. In a flanging machine, a segmental flanging plate and means for separating and again assembling said segments by both rectilinear and curvilinear movements.

24. In a flanging machine, a segmental flanging plate and means for separating the segments of said plate, each segment having movement first in a straight line and subsequently that of revolution.

25. In a flanging machine, a segmental flanging plate and means for repeatedly separating and again assembling the segments of said plate, each segment having movement first rectilineally, second, curvilineally, and third, rectilineally to its original position.

26. In a flanging machine, a flanging plate comprising four segments and means for first separating one pair thereof from the other and subsequently separating the segments of each pair and bringing opposite segments of both together to form new separated pairs.

27. In a flanging machine, a flanging plate comprising four segments and means for first separating one pair thereof from the other, subsequently separating the segments of each pair and forming new separated pairs, and finally re-assembling said new pairs in their original positions.

28. In a flanging machine, the combination, with a stationary horn for interiorly supporting a can body, and suitable exterior supporting means, of a segmental flanging plate and means for separating the segments from each other by curvilinear movement to have the effect of expanding said plate upon the sides of said horn.

29. In a flanging machine, the combination, with a stationary can-body-supporting horn, of a correspondingly shaped segmental plate at both the top and bottom of said horn, and means for correspondingly separating the segments of each plate to have the effect of expanding the same upon the sides of said horn.

30. In a flanging machine, the combination, with a stationary can-body-supporting horn, of a segmental plate of corresponding configuration at both the top and the bottom of said horn, means for correspondingly separating the segments of each plate to have the effect of expanding the same upon the sides of said horn and subsequently returning said segments to their original assembled condition, and means for ejecting a flanged body from and delivering an unflanged body to said horn while said segments are in their assembled condition.

31. In a flanging machine, the combination, with a stationary horn for interiorly supporting a can body, and suitable exterior supporting means, of a segmental flanging plate normally of the same lateral dimensions and configuration as said horn, and means for separating the plate-segments from each other by combined movements which carry said segments upon the entire contiguous edge of said horn.

32. In a flanging machine, the combination, with a stationary horn for interiorly supporting a can body, and suitable exterior supporting means, of a segmental flanging plate normally of the same lateral dimensions and configuration as said horn, and means for separating the segments of each pair to have the effect of expanding said plate upon the entire extent of the edge of said horn.

33. In a flanging machine, the combination, with a stationary horn for interiorly supporting a can body, and suitable exterior supporting means, of a segmental flanging plate, normally of the same lateral dimensions and configuration as said horn, at both the top and bottom of said horn, and means for correspondingly separating the segments of each pair to have the effect of correspondingly expanding said plates upon the entire extent of each end edge of said horn.

34. In a flanging machine, a segmental flanging plate, a plurality of arms, one for each plate-segment and suitably secured thereto, and means for operating said arms to separate said segments from each other by the curvilinear movement.

35. In a flanging machine, a pair of corresponding segmental flanging plates, a plurality of arms, one for each pair of corresponding segments in both plates which pair of segments is suitably secured thereto, and means for operating said arms to correspondingly separate the segments of each plate from each other.

36. In a flanging machine, a segmental flanging plate, a plurality of arms, one for each plate-segment and suitably secured thereto, and means for operating said arms to first separate said segments in pairs and subsequently separate the segments of each pair.

37. In a flanging machine, a pair of segmental flanging plates, a plurality of arms, one for each pair of corresponding segments in both plates which pair of segments is suitably secured thereto, and means for operating said arms to first separate corresponding pairs of segments in both plates and subsequently separate the segments of each pair, to have the effect of expanding said plates.

38. In a flanging machine, a segmental flanging plate, a plurality of arms, one for each plate-segment and suitably secured thereto, and means for operating said arms to first separate said segments into pairs, subsequently to separate the segments of each pair and form new separate pairs, and finally return said segments to their original positions.

39. In a flanging machine, a pair of segmental flanging plates, a plurality of arms, one for each pair of corresponding segments in both plates which pair of segments is suitably secured thereto, and means for operating said arms to first separate corresponding pairs of segments in each plate, subsequently to correspondingly separate the segments of each pair and thus form new separated pairs, and finally to return all segments to their original positions.

40. In a flanging machine, the combination, with means for supporting a can body, of a segmental flanging plate normally wholly included within an end edge of said body when positioned, a plurality of arms to each of which one of the plate-segments is secured, and means for operating said arms to separate said segments by curvilinear movement and thus have the effect of expanding said plate.

41. In a flanging machine, the combination, with means for supporting a can body, of a pair of segmental flanging plates each normally wholly included within an end edge of said body when positioned, a plurality of arms to each of which a corresponding segment in each plate is secured, and means for operating said arms to separate the segments of each plate.

42. In a flanging machine, the combination, with means for suitably supporting a can body, of a segmental plate normally wholly included within an end edge of said body when positioned, a plurality of arms to each of which one of the plate-segments is secured, and means for operating said arms to first separate said segments in pairs and subsequently separate the segments of each pair.

43. In a flanging machine, the combination, with means for suitably supporting a can body, of a pair of segmental flanging plates each normally wholly included within an end edge of said body when positioned, a plurality of arms to each of which a corresponding segment in each plate is secured, and means for operating said arms to first separate the segments of each plate into corresponding pairs and subsequently correspondingly separate the segments of each pair.

44. In a flanging machine, the combination, with suitable can-body-supporting means and a segmental flanging plate coöperating with said supporting means, of two pairs of arms, each segment of said plate being secured to one of said arms and the arms of each pair having pivotal connection with each other, means for imparting pivotal movement to said arms, and means for reciprocating the pivots.

45. In a flanging machine, the combination, with suitable can-body-supporting means, and a segmental flanging plate coöperating with said supporting means, of two pairs of arms, each segment of said plate being secured to one of said arms and the arms of each pair having pivotal connection with each other, means for imparting corresponding pivotal movements to said arms, and means for correspondingly reciprocating the pivots.

46. In a flanging machine, the combination, with suitable can-body-supporting means, and a segmental flanging plate coöperating with said supporting means, of two pairs of arms, and the arms of each segment of said plate being secured to said arms each pair having pivotal connection with each other, means for imparting pivotal movements to said arms, means for reciprocating the plates, and means for interdependently timing the various movements of said arms.

47. In a flanging machine, the combination, with suitable can-body-supporting means, and a segmental flanging plate coöperating with said supporting means, of two pairs of arms, each segment of said plate being secured to one of said arms and the arms of each pair having pivotal connection with each other, means for imparting corresponding pivotal movements to said arms, means for correspondingly reciprocating the pivots, and means for interdependently timing the various movements of said arms.

48. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connection with each other, means for imparting pivotal movement to said arms, and means for reciprocating the pivots.

49. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connection with each other, means for imparting corresponding pivotal movements to said arms, and means for correspondingly reciprocating the pivots.

50. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connection with each other, means for imparting pivotal movements to said arms, means for reciprocating the pivots, and means for interdependently timing the various movements of said arms.

51. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connection with each other, means for imparting corresponding pivotal movements to said arms, means for correspondingly reciprocating the pivots, and means for interdependently timing the various movements of said arms.

52. In a flanging machine, the combination, with suitable can-body-supporting means, and a segmental flanging plate coöperating with said means, of two pairs of arms, each plate-segment being secured to one of said arms and the arms of each pair having pivotal connection with each other, means intermittently operable to impart pivotal movements to said arms and reciprocate the pivots, and means for ejecting a flanged body from and an unflanged body to said supporting means while said arms are in their normal positions of rest.

53. In a flanging machine, the combination, with suitable can-body-supporting means, and a segmental flanging plate coöperating with said supporting means, of two pairs of arms, each plate-segment being secured to one of said arms and the arms of each pair having pivotal connection with each other, means intermittently operable to impart corresponding pivotal movements to said arms and to correspondingly reciprocate the pivots, and means for ejecting a flanged body from and delivering an unflanged body to said supporting means while said arms are in their normal positions of rest.

54. In a flanging machine, the combination, with suitable can-body-supporting means, and a segmental flanging plate coöperating with said supporting means, of two pairs of arms, each plate-segment being secured to one of said arms and the arms of each pair having pivotal connection with each other, means intermittently operable to impart pivotal movements to said arms and to reciprocate the pivots, means for ejecting a flanged body from and delivering an unflanged body to said supporting means while said arms are in their normal positions of rest, and means for interdependently timing the above operations.

55. In a flanging machine, the combination, with suitable can-body-supporting means, and a segmental flanging plate coöperating with said supporting means, of two pairs of arms, each plate-segment being secured to one of said arms and the arms of each pair having pivotal connection with each other, means intermittently operable to impart corresponding pivotal movements to said arms and to correspondingly reciprocate the pivots, means for ejecting a flanged body from and delivering an unflanged body to said supporting means while said arms are in their normal positions of rest, and means for interdependently timing the above operations.

56. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connections with each other, means intermittently operable to impart pivotal movement to said arms, means for reciprocating the pivots, and means for ejecting a flanged body from and delivering an unflanged body to said supporting means while said arms are in their normal positions of rest.

57. In a flanging machine, the combination, with suitable can - body - supporting means, and a pair of segmental flanging plates coöperating with said supporting means, one on each side thereof, of two pairs of arms, a corresponding segment in each plate being secured to one of said arms and the arms of each pair having pivotal connection with each other, means intermittently operable to impart corresponding pivotal movements to said arms and to correspondingly reciprocate the pivots, and means for ejecting a flanged body from and delivering an unflanged body to said supporting means while said arms are in their normal positions of rest.

58. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connection with each other, means intermittently operable to impart pivotal movements to said arms and to reciprocate the pivots, means for ejecting a flanged body from and delivering an unflanged body to said supporting means, while said arms are in their normal positions of rest, and means for interdependently timing the above operations.

59. In a flanging machine, the combination, with suitable can-body-supporting means, and a pair of segmental flanging plates coöperating with said supporting means, one on each side thereof, of two pairs of arms, a corresponding segment in each plate being secured to one of said arms and the arms of each pair having pivotal connection with each other, means intermittently operable to impart corresponding pivotal movements to said arms and to correspondingly reciprocate the pivots, means for ejecting a flanged body from and delivering an unflanged body to said supporting means while said arms are in their normal positions of rest, and means for interdependently timing the above operations.

60. In a flanging machine, the combination, with intermittently-operating means for engaging and supporting a can body, of a segmental flanging plate in coöperative positional relation to said supporting means, means for separating the plate-segments by curvilinear movement, and means for interdependently timing operations of said supporting and said separating means.

61. In a flanging machine, the combination, with stationary means for interiorly supporting a can body and intermittently-operating exterior supporting means, of a segmental flanging plate in coöperative positional relation to said supporting means, means for separating the plate-segments by curvilinear movement, and means for interdependently timing operations of said exterior supporting means and of said separating means.

62. In a flanging machine, the combination, with means intermittently operable to engage and support a can body, of a segmental flanging plate in coöperative positional relation to said supporting means, means for separating the plate-segments, means for ejecting a flanged body from and delivering an unflanged body to said supporting means while other parts are at rest in their normal positions, and means for interdependently timing the above operations.

63. In a flanging machine, the combination, with stationary means for interiorly supporting a can body and intermittently-operating exterior supporting means, of a segmental flanging plate in coöperative positional relation to said supporting means, means for separating the plate-segments, means for ejecting a flanged body from and delivering an unflanged body to said supporting means while other parts are at rest in their normal positions, and means for interdependently timing the above operations.

64. In a flanging machine, the combination, with intermittently-operating means for engaging and supporting a can body, of a pair of segmental flanging plates in coöperative positional relation to said supporting means, one on each side thereof, means for correspondingly separating the segments of each plate, and means for interdependently timing operations of said supporting and said separating means.

65. In a flanging machine, the combination, with stationary means for interiorly supporting a can body and intermittently-operating exterior supporting means, of a pair of segmental flanging plates in coöperative positional relation to said supporting means, one on each side thereof, means for correspondingly separating the segments of each plate, and means for interdependently timing operations of said exterior supporting means and said separating means.

66. In a flanging machine, the combination with intermittently-operating means for engaging and supporting a can body, of a pair of segmental flanging plates in coöperative positional relation to said supporting means, one on each side thereof, means for correspondingly separating and assembling, intermittently, the segments of each plate, means for ejecting a flanged body from and delivering an unflanged body to said supporting means while other parts are at rest in their normal positions, and means for interdependently timing the above operations.

67. In a flanging machine, the combination, with stationary means for interiorly supporting a can body and intermittently-operating exterior supporting means, of a pair of segmental flanging plates in coöperative positional relation to said supporting means, means for correspondingly separating and assembling, intermittently, the segments of each plate, means for ejecting a flanged body from and delivering an unflanged body to said supporting means while other parts are at rest in their normal positions, and means for interdependently timing the above operations.

68. In a flanging machine, the combination, with means for suitably supporting a rectilinear can body having rounded corners, of means normally lying wholly within and between the end edges of said body when positioned and first operable toward opposite side portions of an end edge of said body to flange said portions of said edge and subsequently operable laterally to flange the rounded corners and the remaining side portions of said edge.

69. In a flanging machine, the combination, with means for suitably supporting a rectilinear can body having rounded corners, of means normally lying wholly within and between the end edges of said body when positioned and first operable toward opposite side portions of an end edge of said body to flange said portions of said edge and subsequently operable laterally and curvilineally to flange the rounded corners and the remaining side portions of said edge.

70. In a flanging machine, the combination, with means for suitably supporting a rectilinear can body having rounded corners, of means normally lying wholly within and between the end edges of said body when positioned and first operable toward opposite side portions of the end edges of said body to flange said end edges and subsequently operable laterally to flange the rounded corners and the remaining side portions of said end edges.

71. In a flanging machine, the combination, with means for suitably supporting a rectilinear can body having rounded corners, of means normally lying wholly within and between the end edges of said body when positioned and first operable toward opposite side portions of the end edges of said body to flange said portions of said edges and subsequently operable laterally and curvilineally to flange the rounded corners and the remaining side portions of said edges.

In testimony of the foregoing, I have hereunto set my hand in the presence of two witnesses.

JULIUS BRENZINGER.

Witnesses:
Jno. H. Bowersock,
P. F. Sonnek.

---

Copies of this patent may be obtained for five cents each, by addressing the "Commissioner of Patents, Washington, D. C."